(12) United States Patent
Kim et al.

(10) Patent No.: US 6,950,466 B2
(45) Date of Patent: Sep. 27, 2005

(54) APPARATUS FOR RECEIVING MOVING PICTURES

(75) Inventors: Eung Tae Kim, Seoul (KR); Tae Il Chung, Seoul (KR)

(73) Assignee: LG Electronics, Inc., Seoul (KR)

( * ) Notice: Subject to any disclaimer, the term of this patent is extended or adjusted under 35 U.S.C. 154(b) by 727 days.

(21) Appl. No.: 09/799,522

(22) Filed: Mar. 7, 2001

(65) Prior Publication Data

US 2001/0026588 A1 Oct. 4, 2001

(30) Foreign Application Priority Data

Mar. 8, 2000 (KR) ........................................ 2000-11520

(51) Int. Cl.⁷ ............................................. H04N 7/12
(52) U.S. Cl. ............ 375/240.12; 375/240; 375/240.01; 375/240.02; 375/240.25
(58) Field of Search ........................... 375/240.12, 240, 375/240.01, 240.02, 240.18, 240.25, 240.04, 240.15, 240.22, 244; 345/555; 715/500.1

(56) References Cited

U.S. PATENT DOCUMENTS

| | | | | |
|---|---|---|---|---|
| 5,870,087 A | * | 2/1999 | Chau | 715/500.1 |
| 5,933,195 A | * | 8/1999 | Florencio | 375/240.15 |
| 5,986,711 A | * | 11/1999 | Pau | 375/240.18 |
| 6,023,295 A | * | 2/2000 | Pau | 375/240.04 |
| 6,061,402 A | * | 5/2000 | Boyce et al. | 375/240 |
| 6,078,620 A | * | 6/2000 | Rennig | 375/244 |
| 6,208,333 B1 | * | 3/2001 | Tateyama | 345/555 |
| 6,320,907 B1 | * | 11/2001 | Pau et al. | 375/240.22 |

* cited by examiner

Primary Examiner—Allen Wong
(74) Attorney, Agent, or Firm—Fleshner & Kim, LLP

(57) ABSTRACT

A memory reducing device in an apparatus for receiving moving pictures is applied to the fields such as a digital television receiver, a digital video conference system and the like. The memory reducing device enables to reduce an external memory of an MPEG-2 video decoding chip and obtain standard deviations by predicting the current pixel using a pixel located at the highly-related direction which is determined by having the deviation estimating part measure the relation between the horizontal or vertical direction of the pixels adjacent there between and to be currently encoded. Moreover, the memory reducing device enables to increase a compression ratio as well as provide clear distinction of high definition by reducing the difference less than the bit precision of the current pixel by means of predicting the current pixel by selecting the pixel located at the highly-related direction with the above same method and performing quantization with the prediction.

14 Claims, 14 Drawing Sheets

APPARATUS FOR RECEIVING MOVING PICTURES

BACKGROUND OF THE INVENTION

1. Field of Invention

The present invention relates to an apparatus for receiving moving pictures, and more particularly, to a memory reducing device in an apparatus for receiving moving pictures which is applied to the fields such as a digital television receiver, a digital video conference system and the like.

2. Discussion of the Related Art

As the digital television broadcasting becomes a major issue in that broadcasting field, many efforts have been contributed to compress video data to make a television receiver provide a clear distinction of high definition for watching television at home.

MPEG-2 (moving picture expert group—2) is mainly used for an algorithm to compress the video signals. A compressing ration of the MPEG-2 ranges 1/40 to 1/60 which is a relatively large value.

Algorithms such as MPEG-2 enables to transmit digital data of high definition which are usually difficult to be dealt with through general broadcasting channels and further enables to receive the digital data of high definition at home, Therefore, the digital television sets used at home require video decoders for MPEG-2 enabling to receive the compressed data and decode into the original video data of high definition.

FIG. 1 shows a block diagram of a MPEG decoding system according to a related art.

Referring to FIG. 1, a transport (TP) decoder 101 selects a program out of a plurality of programs included in a channel and then divide packetized audio and video bit streams. The divided video bit stream is outputted through a data bus to a video decoder 102.

The video decoder 102 gets a pure data information by removing overheads such as various header informations, start code and the like from the inputted video bit streams.

The data information uses variable length decoding (VLD), inverse quantization, inverted discrete cosine transform and motion vectors to achieve the motion compensation. Thus, the video decoder 102 restores the inputted video stream to original pixel values and outputs the restored pixel values to a video display processor (VDP) 103.

The video display processor 103 rearranges and outputs the restored pixel values according to a picture type or outputs the restored pixel values as inputted.

Besides, as mentioned in the above description, a video decoder system taking MPEG-2 as a basic tool uses an external memory 105 comprising a buffer to generally store the bit stream temporarily and at least two frame memories.

DRAMs are used to constitute the frame memories in general. The external memory 105 in the video decoder carries out bit stream write for video decoding, video stream read, data read for motion compensation, decoded data write and data read for display. And, the external memory 105 communicates data with a memory controller 104.

Unfortunately, the external memory 105 in FIG. 1 is proper for processing small data but fails to be proper for processing video data for MPEG-2 MP@HL.

Specifically, large memory capacity and fast transmission speed are required for decoding the video data for MPEG-2 MP@HL. And, bit-buffer size of about 10 Mbits is required for supporting the MP@HL mode for the standard of MPEG-2 and its maximum bit rate amounts to about 80 Mbits/s.

For the above-mentioned reasons, an external memory of about 96 to 128 Mbits using 16 Mbits DRAM as a basis is required for constituting the video decoder for MPEG-2 according to the related art.

Therefore, for securing the cost competition in product and user application, a technology enough to embody excellent image quality as well as reduce the external memory price is strongly required. In view of the trend of providing various OSD (on screen display) functions and services in digital television broadcasting, the capacity of the external memory capacity should be increased in addition.

For instance, in the recent system for restoring the compressed video such as MPEG-2, a variety of services are provided by multi-decoding and displaying many kinds of video signals. In this case, various video signals should be decoded in the memory having a limited capacity.

Considering memory limit, price and bandwidth of a data bus, a memory reducing apparatus for minimizing efficiently the loss of high definition image signals in a video decoding chip is required. And, various methods have been proposed for the solution.

Proposed to eliminate spatial redundancy are memory reducing algorithms built inside the video decoding chip of the related art such as ADPCM (adaptive differential pulse coded modulation) with 50% compression ratio, VQ (vector quantization) with 75% compression ratio and the like. Besides, a compression method that carries out filtering/down-sampling in a DCT frequency range has been proposed as well.

However, the above-proposed methods with 50% to 75% compression ratio have difficulty in providing MPEG-2 MP@HL of high image quality of color components and high textured images. Namely, high definition is inverse proportional to a compression ratio and the relation between the high definition and compression ration needs very complicated algorithm.

Unfortunately, when a memory reduction circuit is embodied as an integrated circuit (IC), it is difficult to implementing the complicated algorithms as well as the number of gates is increased.

As a solution to settle the above problems, an apparatus for receiving moving pictures has been filed to the Korea Intellectual Property Office (Application No. 1999-34694/Application date: Aug. 20, 1999) by the same inventors of the present invention.

The foregoing filed apparatus for receiving moving pictures compresses video decoded data by ADPCM and stores it in an external memory to maintain high definition image as well as carry out motion compensation by macro block unit according to the standard MPEG-2 with ease. And, the foregoing filed apparatus divides the respective macro blocks into 4×8 sub blocks on data compression.

The original pixel value that is not compressed is stored in a first row of each sub block and ADPCM compression is carried out on the rest rows. In this case, data is compressed by applying adaptive standard deviation to quantization and the compressed result is stored in the external memory.

SUMMARY OF THE INVENTION

Accordingly, the invention is directed to an apparatus for receiving moving pictures that substantially obviate one or more of the problems due to limitations and disadvantages of the related art.

The object of the present invention is to provide an apparatus for receiving moving pictures enabling to reduce an external memory of a video decoder for MPEG-2.

Another object of the present invention is to provide an apparatus for receiving moving pictures enabling to maintain high distinction as well as fast processing speed.

A further object of the present invention is to provide an apparatus for receiving moving pictures enabling to maintain high definition image by predicting the current pixels.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings. To achieve these and other advantages and in accordance with the purpose of the present invention, as embodied and broadly described, an apparatus for receiving moving pictures according to the present invention includes a compression part.

The compressing part includes a deviation estimating part, a buffer and an ADPCM compressing part.

The deviation estimating part measures the horizontal and vertical relations between video-decoded pixels prior to a current pixel to be predicted and then selects a pixel located at direction of high correlation. The deviation estimating part calculates a difference between the selected pixel and the current pixel to be predicted and a standard deviation from the difference.

The buffer stores temporarily the video-decoded data by macro block unit and then outputs the data by sub block unit.

The ADPCM compressing part outputs original pixel values, which are not compressed, at every first row of the respective sub blocks outputted from the buffer. The ADPCM compressing part obtain adaptively a difference between the predicted value and the current pixel value in the rest rows of the respective sub blocks and then codes the difference. The standard deviation is applied to adjust quantization intervals when coding the difference.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this application, illustrate embodiments of the inventing and together with the description serve to explain the principle of the invention.

In the drawings:

FIG. 8 shows a progressive scanning picture and an interlaced scanning picture of a val_cal_type respectively;

DETAILED DESCRIPTIONS OF THE PREFERRED EMBODIMENTS

Reference will now be made in detail to the preferred embodiments of the present invention, examples of which are illustrated in the accompanying drawings.

Figure 1:
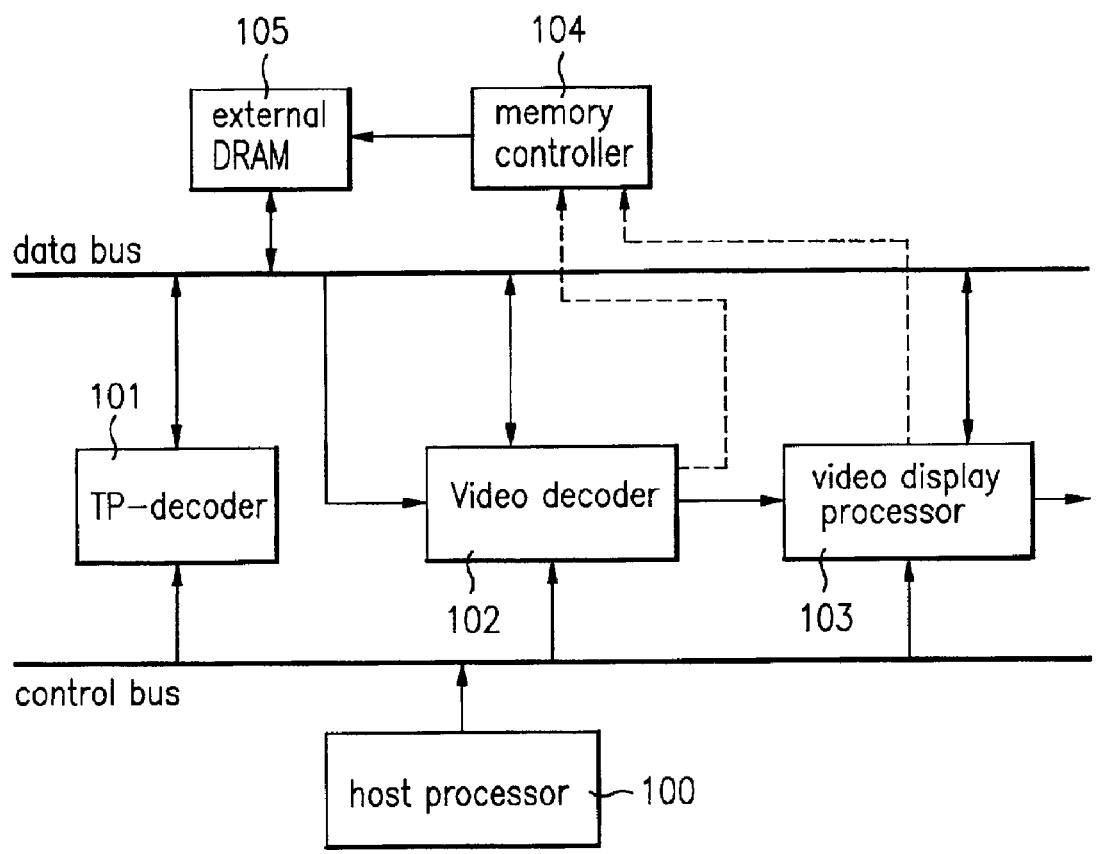
FIG. 1 shows a block diagram of a general MPEG decoding system.
Figure 2:
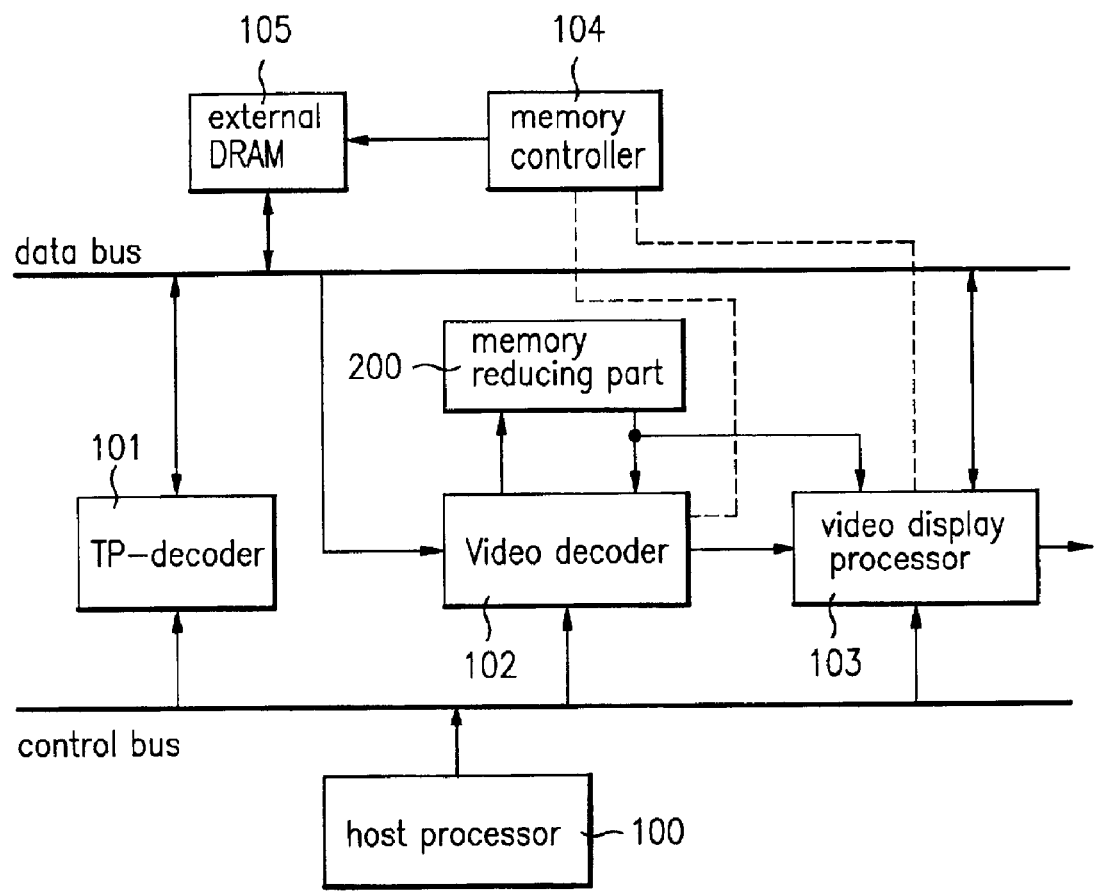
FIG. 2 shows a block diagram of an MPEG decoding system according to the present invention.

FIG. 2 shows a block diagram of an MPEG decoding system according to the present invention wherein a memory reducing part 200 is added to the structure in FIG. 1.

Referring to FIG. 2, the external memory 105 may include a general DRAM (dynamic random access memory) or a synchronous SRAM (static random access memory) for a high speed interface.

Figure 3:
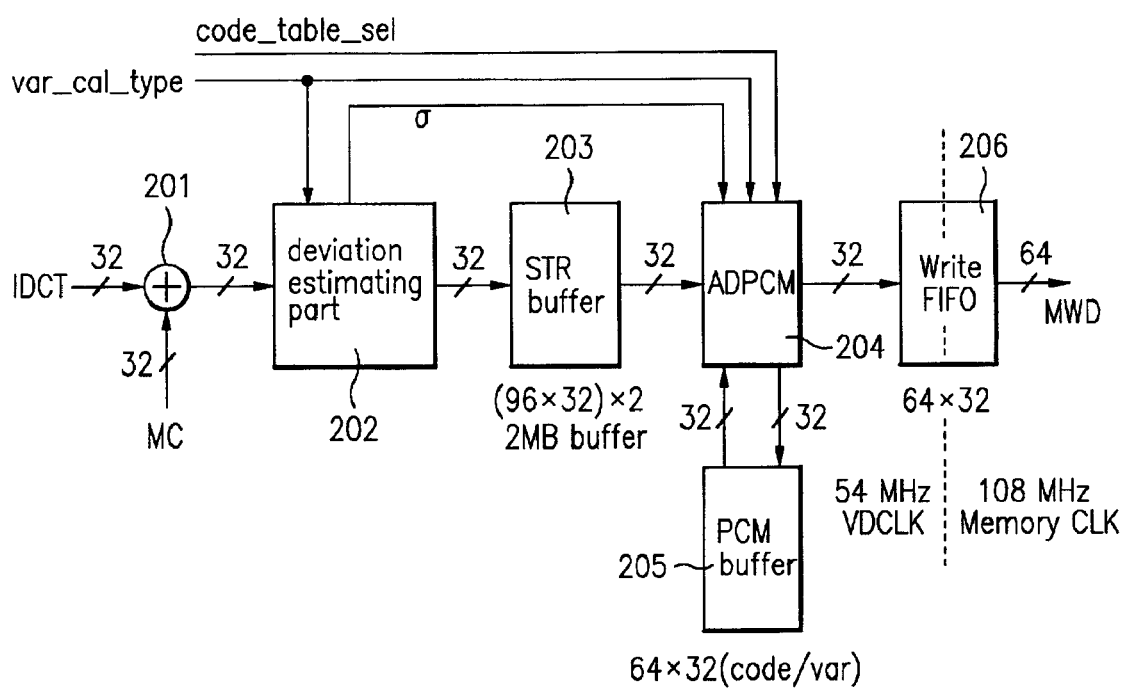
FIG. 3 shows in detail a block diagram of a memory reducing part in FIG. 2.

FIG. 3 shows in detail a block diagram of a memory reducing part 200 in FIG. 2.

Referring to FIG. 3, the memory reducing part 200 includes an adder 201 adding IDCT data in the video decoder 102 to motion compensated data, a deviation estimating part 202 calculating a standard deviation σ from an output signal of the adder 201, a STR (storage) buffer 203 storing an output of the adder 201 as a macro block unit, an ADPCM encoder 204 compressing the data stored in the STR buffer 203 as a macro block unit by applying the standard deviation by ADPCM, a PCM buffer 205 storing the data compressed by ADPCM, and a write FIFO (first in first out) memory 206 reading and storing the compressed data stored in the PCM buffer 205 in the external memory 105.

The transport decoder 101 divides the input bit stream into a packetized audio bit stream and video stream and then outputs the divided video stream to an MPEG-2 video decoder 102. The MPEG-2 video decoder 102 carries out motion compensation by suing VLD (variable length decoding), IQ/IDCT and motion vectors to constitute I,P, B pictures.

And, the IDCT data and motion-compensated data are added to the adder 201 in the memory reducing part 200. Then, the adder outputs a completely restored image.

In this case, the image data of macro blocks restored by the adder 201 is inputted to the deviation estimating part 202 as soon as stored in the STR buffer 203 as a memory before being stored in the external memory 105. And, a data bus for macro block transmits the data as 32 bits (4 pixels×8 bits/pixel) unit.

Figure 4:
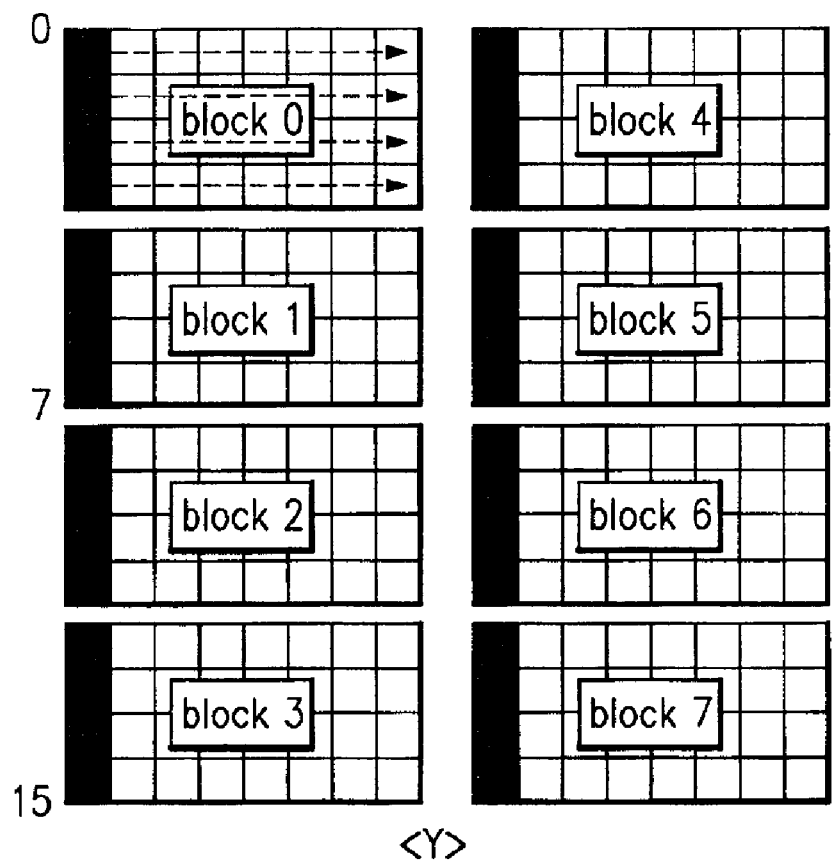
FIG. 4 shows sub blocks in macro blocks according to the present invention.
Figure 4:
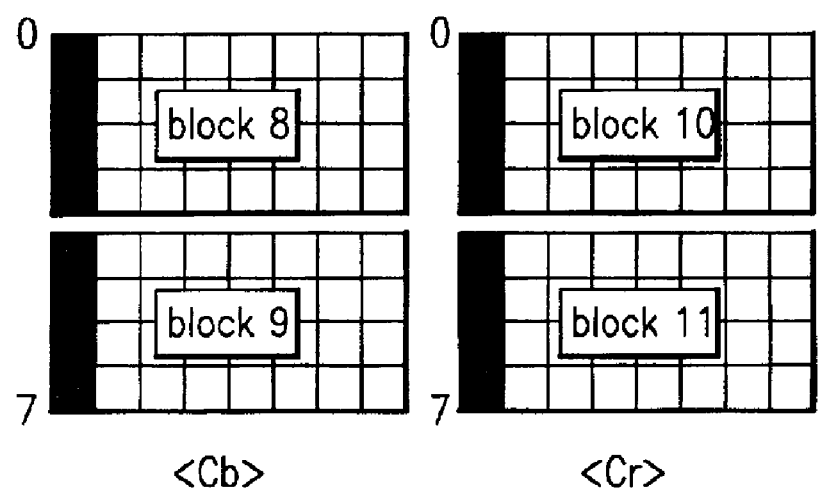

Accordingly, the deviation estimating part 202 divides the respective macro blocks, as shown in FIG. 4, into 4×8 sub blocks and then calculating each adaptive standard deviation σ by the respective sub block units, thereby outputting the calculated adaptive standard deviation σ to the ADPCM compressing part 204. In this case, the standard deviation σ manipulates quantizing intervals of the respective sub blocks.

And, the STR buffer 203 temporarily stores the pixel values of the respective macro blocks and then divides the pixel values into 4×8 sub blocks, thereby outputting data of 4 pixel units to the ADPCM compressing part 204.

In other words, as shown in FIG. 4, if each of the macro blocks relating to a brightness signal Y and color signals Cb and Cr is divided into a 32 bit (4 pixels×8 bits/pixel) unit, the resultant of the brightness signal Y is divided into 8 sub blocks and the resultants of the color signals Cb and Cr are divided into 2 sub blocks respectively.

In this case, the STR buffer 203 is dual buffers for storing macro blocks. And, one of the buffer stores, for instance, 96×32 bits.

The ADPCM compressing part 204 carries out the compression by ADPCM by using the informations outputted from the STR buffer 203 And the standard deviation information as well as stores the carried-out resultants, i.e. quantized codes (m,n) and the standard deviation σ, in the PCM buffer 205.

Figure 5:
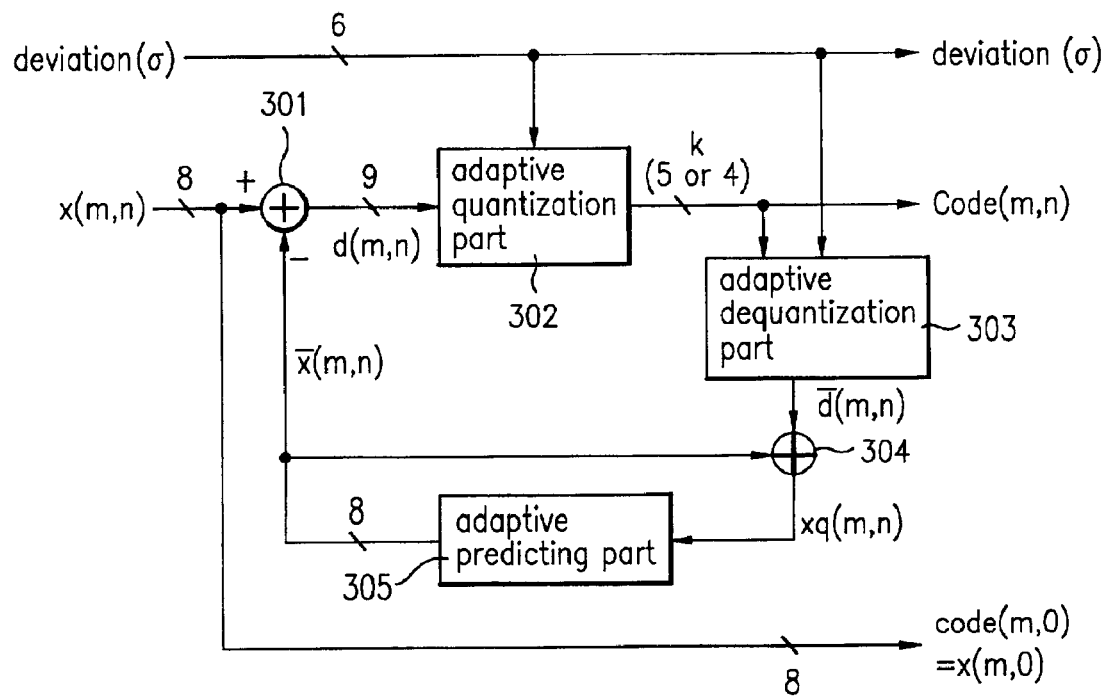
FIG. 5 shows in detail an ADPCM compressing part in FIG. 3.

FIG. 5 shows in detail an ADPCM compressing part in FIG. 3.

The ADPCM compressing part 204 consists of a subtracter 301 outputting the difference between the output data x(m,n) of the STR buffer 203 and the adaptively-predicted data bar_x(m,n), an adaptive quantization part 302 performing the quantization adaptively using the output data d(m,n) of the subtracter 301 and the standard deviation σ, an adaptive dequantization part 303 inverse-quantizing the quantized data, an adder 304 adding the output data of the adaptive dequantization part 303 to the adaptively-predicted data bar_x(m,n), and an adaptive predicting part 305 performing adaptive prediction from the output data bar_xq (m,n) of the adder 304 and outputting the performed resultant which is an adaptive prediction data bar_x(m,n) to the subtracter 301 and the adder 304.

Figure 6:
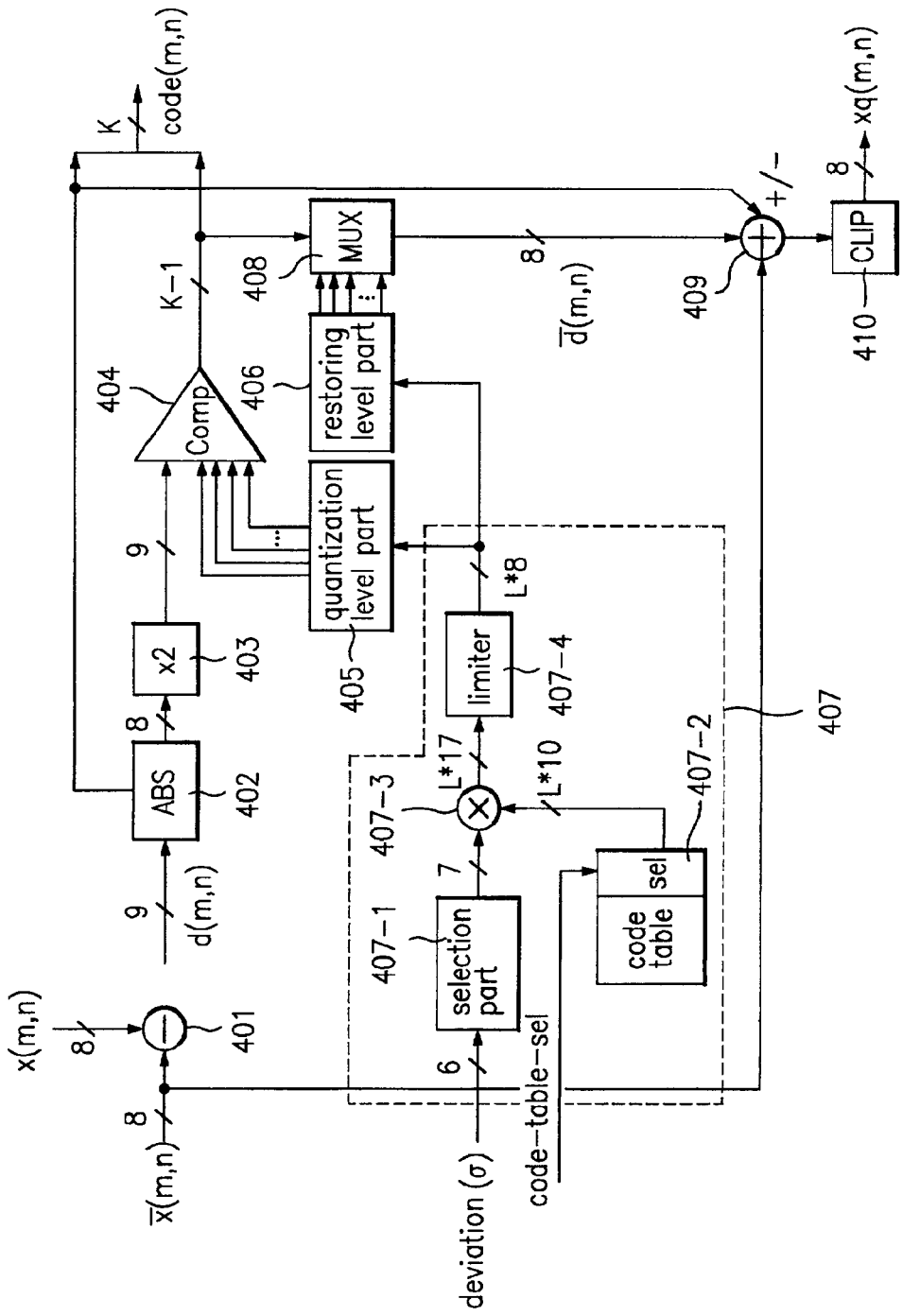
FIG. 6 shows an adaptive quantization part and an inverted quantization part in FIG. 5.

FIG. 6 shows the adaptive quantization part 302 and adaptive dequantization part 303 and adder 304 in FIG. 5.

Referring to FIG. 6, the adaptive quantization part 302 consists of an absolute value operation part 402, a product device 403, a comparator 404, a quantization level part 405 and a code table part 407.

The adaptive dequantization part 303 consists of a restoring level part 406 and a multiplexer 408.

The subtracter 401 in FIG. 6 has the same constitution of the other subtracter 301 in FIG. 5. And the adder 409 and a clipper 410 constitute other adders 304 and 401 in FIG. 5 and FIG. 6.

The code table part 407 in FIG. 6 consists of L code tables 407-2 of 10 bits, for instance, ROM (read only memory). And, normalized quantization values are stored in the respective code tables 407-2.

It is assumed, so to speak, that Q(I), I=1, ..., L are the quantization values. In this case, the normalized quantization values of the number of L mapped in the selected code table by a code_table_sel signal are outputted to the product device 407-3.

In this case, $L=2^{(K-1)}$ indicates a quantization level and K denotes the number of the quantization code. And, it is excluded that L becomes 2 (K−1) because a most upper bit is a signal bit. For instance, K=5 and L=16 for brightness, while K=4 and L=8 for color. Then, quantiztion coefficient in a block is adjusted by the product device 407-3 such as the following formula (1).

$$Q=q(I)\times\sigma \quad (1)$$

Therefore, the comparator 404 quantizes a predictive error using Q inputted through a limiter 407-4 and a quantization level part 405. In this case, it is assumed in general that the distribution of the predictive error follows Gaussian or Laplacian distribution.

The distribution of the predictive error differs in brightness and color signals. And, the distribution in a block of the color signal is generally less than that of the brightness signal. Thus, improved image quality is realized by allotting more quantization levels to the brightness signal.

For example, the quantization levels of the brightness signal consists of 16 steps and intervals between the respective levels differs in accordance with the size of the standard deviation σ. If the standard deviation σ is large, the intervals between the quantization levels become broad. But, the intervals between the quantization levels become narrow if the standard deviation σ is small.

In other words, the case that the standard deviation σ is large means that the image variation in the block is large. Further, human eyes are unable to sense the variation even if the intervals between the quantization levels are broadened.

In this case, the detailed description of FIG. 6 explained in the specification of Korean patent application filed to Korea Intellectual Property Office by the same inventors of the present invention may be skipped.

Figure 7:
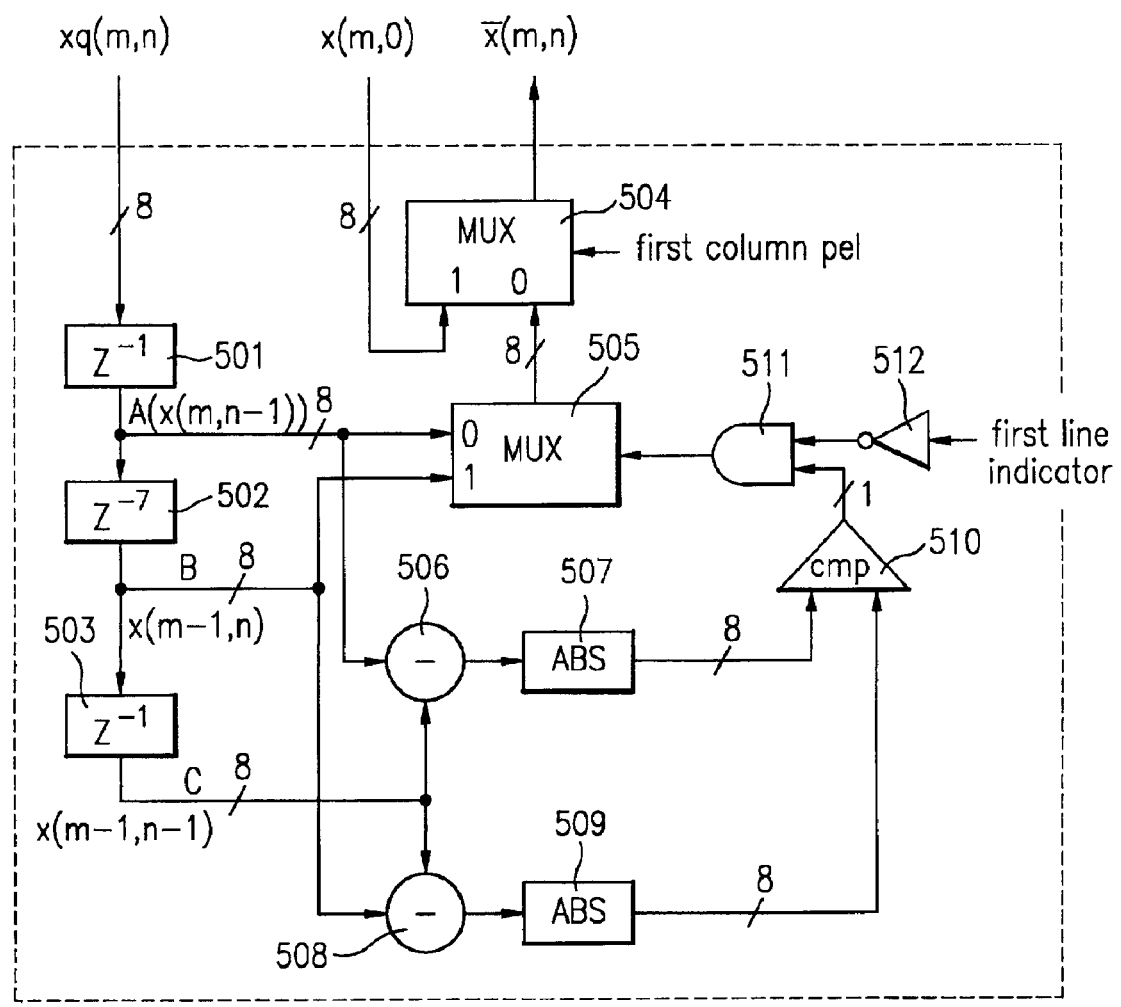
FIG. 7 shows an adaptive prediction part in FIG. 5.

FIG. 7 shows in detail an adaptive prediction part 305 in FIG. 5.

Referring to FIG. 7, the adaptive prediction part 305 consists of a first delayer 501 delaying an output of the adder 304 by 1 clock, a second delayer 502 delaying an output of the first delayer 501 by 7 clocks, a third delayer 503 delaying an output of the second delayer 502 by 1 clock, a first multiplexer 505 outputting selectively one of the outputs of the first and second delayers 501 and 502, a first subtracter 506 outputting a difference between the outputs of the first delayer 501 and the third delayer 503, a first absolute value operation part 507 taking an absolute value of an output of the first subtracter 506, a second subtracter 508 outputting a difference between the outputs of the second delayer 502 and third delayer 503, a second absolute value operation part 509 taking an absolute value of an output of the second subtracter 508, a comparator 510 comparing outputs of the first and second absolute value operation parts 507 and 509, an AND gate 511 outputting a logic combination value as a selection signal to the first multiplexer 505 by combining logically an output of the comparator 510 with an output of an inverter 512 which is attained by inverting a value of a first line indicator, and a second multiplexer 504 selecting as a final output either an output of the first multiplexer 505 of an original pixel value x(m,0) which is not compressed using a first column pixel value FIRST COLUMN PEL as a selection signal.

The ADPCM compressing part 204 having the structure of the above explanation removes the redundancy by means of using the relation between the current pixel and the previous pixel.

The ADPCM compressing part 204 transmits a first column of the respective rows of the respective sub blocks as an original pixel value [code(m,0)] but the difference by coding the difference between the adaptive prediction value and the current pixel value for the rest of the columns [code(m,n)]. Namely, a data compression ratio is increased by reducing the difference between the adaptive prediction value and the current pixel value to be less than the bit-precision of the current pixel.

In this case, the scanning procedure of the ADPCM compressing part 204 is executed horizontally at the respective rows of the sub blocks as shown in FIG. 4.

For example, it is assumed that image data is divided into M×N sub blocks and defined that x(m,n) is a pixel value of mth row and nth column in a block. And, a predicted value bar_x(m,n) may be denoted by the following formula (2) provided that bar_x(m,n) is a predicted value in the adaptive prediction part 305.

$$\begin{align}
\text{bar\_}x(m, n) &= x(m, O) && \text{if } \forall\, m, n = 0 \tag{2}\\
&= x(m, n-1) && \text{else if } m = 0,\; n = 1, \ldots, N-1\\
&= x(m-1, n) && \text{else if } |A - C| < |B - C|\\
&= x(m, n-1)\, o.w
\end{align}$$

Let us define that d(m,n)=x (m,n)−bar_x(m,n). In this case, A is a pixel left to the current pixel to be predicted, i.e., a previous pixel x(m, n−1) by 1 pixel, B is a pixel vertically upper to the current pixel to be predicted, i.e., a previous pixel x(m,−1, n) 1 line prior to the current pixel, and C is a pixel located at a left-diagonal direction of the current pixel to be predicted.

Thus, a pixel at the direction having less difference becomes a prediction value of the current pixel by measuring the difference between the horizontal and vertical directions of the previously-decoded pixels. A simple circuit as shown in FIG. 6 may implement the detail of the above construction.

A is an output of the first delayer 501 delaying an output of the adder 304 by 1 clock, B is an output of the second delayer 502 delaying an output of the first delayer 501 by 7 clocks, and C is an output of the third delayer 503 delaying an output of the second delayer 502 by 1 clock.

The first subtracter 506 outputs the signal difference A−C to the first absolute value operation part 507 wherein the signal difference A−C is sought between the first and third delayers 501 and 503. And the first absolute value operation part 507 outputs an absolute value |A−C| by taking an absolute value of the signal difference A−C to the comparator 510.

The second subtracter 508 outputs a signal difference B−C between two signals outputted from the second and third delayers 502 and 503 to the second absolute value operation part 509. Then, the second absolute value operation part 509 outputs an absolute value |B−C| by taking an absolute value of the signal difference B−C to the comparator 510.

The comparator 510 outputs a logic signal, 0 or 1, to the AND gate 511 by comparing the output sizes of the first and second absolute value operation parts 507 and 509.

In the present invention, when the output |A−C| of the first absolute value operation part 507 is less than that |B−C| of the second absolute value operation part 509, the difference is small to the vertical direction. Thus, 1 is outputted to make the output x(m−1, n) of the second delayer 502 to be selected by the first multiplexer 505.

Otherwise, the horizontal difference is smaller than the vertical. Therefore, 0 is outputted to make the output x(m, n−1) of the first delayer 501 to be selected by the first multiplexer 505.

The AND gate 511 combines an output of the comparator 510 with an output of the inverter 512 logically, thereby providing the first multiplexer 505 with a selection signal. And, the inverter 512 inverts a value of the first line indicator.

In this case, for example, if the currently-inputted data is a first line, the first line indicator outputs a value of 1 and the inverter 512 inverts the output to be outputted to the AND gate 511.

Therefore, the AND gate 511 always outputs 0 to the first multiplexer 505 owing to the characteristic of the AND gate 511 if both outputs of the comparator 510 and the inverter 512 are 0 or one of the outputs is at least 0. But, 1 is outputted to the first multiplexer 505 only when both outputs of the comparator 510 and inverter 512 are 1.

Namely, 0 is outputted from the AND gate 511 when the output |A−C| of the first absolute value operation part 507 is not smaller than that |B−C| of the second absolute value operation part 509 or the first line indicator is at the first line.

Accordingly, the first multiplexer 505 generates the output x(m. n−1) of the first delayer 501 when the AND gate 511 outputs '0' to the second multiplexer 504. But, the first multiplexer 505 generates the output x(m−1, n) of the second delayer 502 to the second multiplexer 504 when '1' is outputted from the AND gate 511.

The second multiplexer 504 uses a first column pixel signal FIRST COLUMN PEL as a selection signal. If the first column pixel signal FIRST COLUMN PEL denotes a pixel of the current first column, an original pixel value x(m,0) which is not compressed is selected and outputted to the subtracter 301 and the adder 304.

On the other hand, if the first column pixel signal FIRST COLUMN PEL is not a pixel of the current first column, an output of the first multiplexer 505 is selected and outputted to the subtracter 301 and the adder 304.

In this case, during performing ADPCM, the adaptive quantization part 302 compresses the data with fixed length codes (FLC) by transferring the first pixel as 8 bits/pixel to each row of the sub block and quantizing a predictive error d(m,n), i.e. the difference between the current pixel value x(m,n) and the output bar_x(m,n) of the second dimensional adaptive prediction part 305, of the rest pixels. It is convenient to address memory map as FLC is used.

Besides, it is desirable to minimize the predictive error so that performance of the ADPCM part 204 is improved. Therefore, quantization coefficients and levels of the adaptive quantization part 302 should be adjusted efficiently so as to express the predictive error in the block sufficiently.

So, the adaptive quantization part 302 reduces the predictive errors by manipulating the quantization intervals using characteristics of the input signals, as shown in FIG. 6, such as average, standard deviation and the like.

An MPEG encoder of the transmitting part encodes a progressive scanning sequence or an interlaced scanning sequence in general, wherein the heat of the image attained by the progressive scanning is called the progressive scanning sequence and the other heat of the image attained by the interlaced scanning is called the interlaced scanning sequence.

In this case, the interlaced-scanning picture is encodes as a Field or frame picture. Namely, the field picture is attained by carrying out the encoding by isolation by field unit, while the frame picture is attained by carrying out the encoding by frame unit.

A picture of the field picture consists of the odd lines of the scan lines and the other picture consists of the even lines of the scan lines, wherein all the encoding and decoding operations are executed by field unit. Thus, DCT (discrete cosine transform) blocks of 8×8 unit consist of either an odd or even field, which is called a field DCT-coded block.

On the other hand, each picture of the interlaced frame picture consists of the odd and even lines of the scan lines so that the macro blocks of the frame picture have both odd and even fields.

The macro blocks of the frame picture may be encoded by a couple of other methods.

First, 4 of the 8×8 DCT-transformed blocks in the macro block (16×16) constitute the frame DCT coded block having odd and even lines respectively.

Second, 2 of the blocks in the macro block consist of odd lines of the block only and the rest 2 blocks consists of even lines only so as to constitute the field DCT coded block.

Namely, the frame DCT coded block divides the macro block into 4 blocks and then carries out DCT on the respective 8×8 blocks, while the field DCT coded block divides the macro block by the corresponding field and then divides the sorted fields by 2 blocks to carry out DCT.

Motion compensation is predicted from the reference field as the macro blocks of the field picture are coded by field DCT. Yet, the macro blocks of the frame picture are coded by frame DCT/field DCT, thereby enabling to predict the motion compensation by frame or field unit.

In the progressive scanning sequence, all the pictures are coded by frame DCT and a frame prediction is performed. Thus, the deviation estimation part 202 includes a device adjusting standard deviations of the interlaced and progressive scans according to the DCT type of the macro block.

Figure 8:
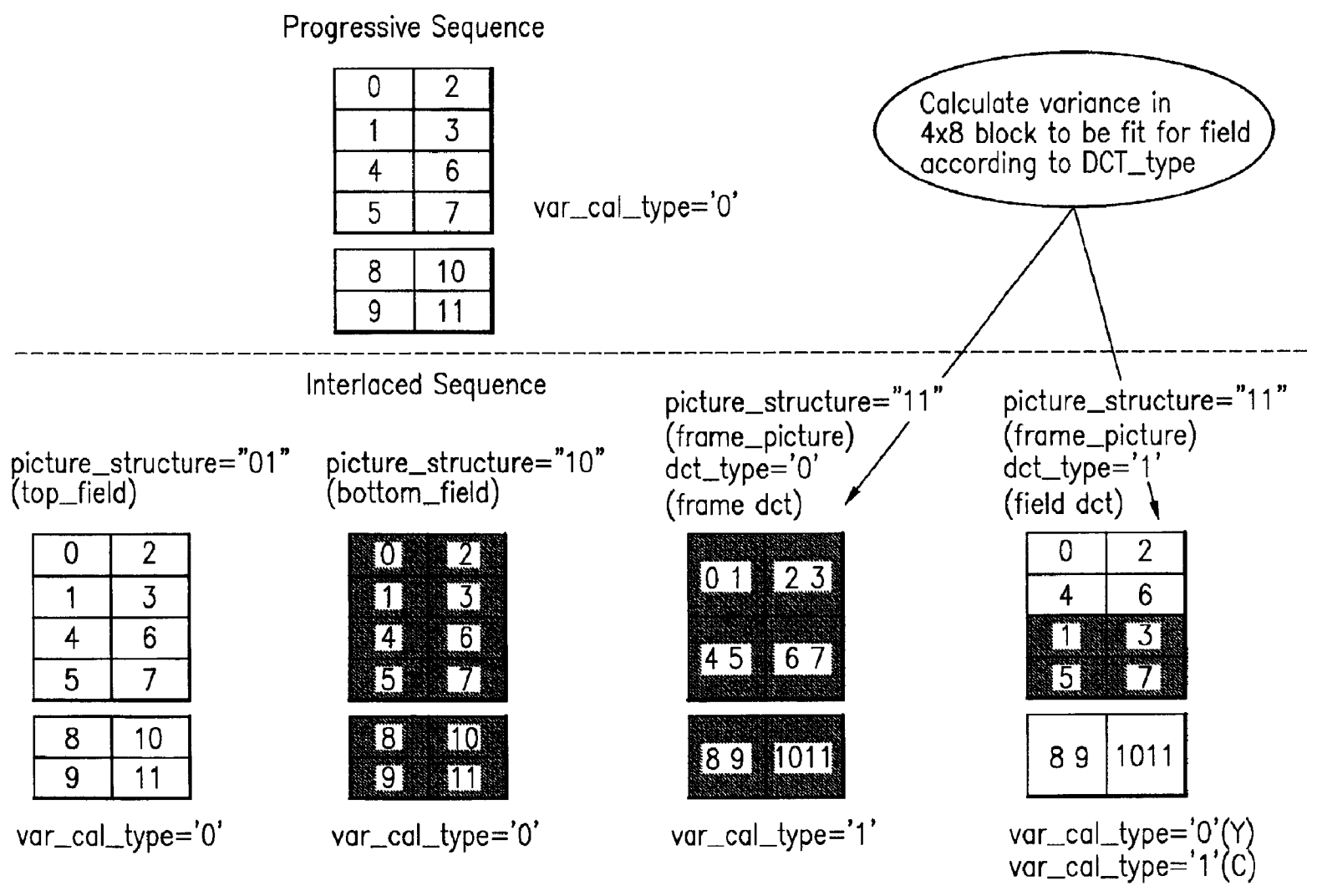

Namely, as shown in FIG. 8, the respective input signals are efficiently distributed according to the DCT type of the interlaced scan.

FIG. 8 shows a progressive scanning picture and an interlaced scanning picture of a val_cal_type respectively.

Referring to FIG. 8, when the val_cal_type is '1', the picture structure is the frame picture, for example, picture_structure=11 as well as the interlaced scanning sequence, In this case, when the DCT type is the field DCT, the color signal C has the value of '1' of the val_cal_type unconditionally and the brightness signal Y is '0'. When the DCT type is the frame DCT, the val_cal_type becomes '1' regardless of the brightness and color signals, i.e., top and bottom fields are distributed alternatively by one line. Further, in other cases, all the val_cal_types are '0', i.e., top and bottom fields are separated respectively.

The deviation estimating part 202 seeks the standard deviation by field unit in the interlaced scan type. For instance, the pixels in the even field constitute a sub block and the pixels in the odd field constitute the other sub block. Especially, when the DCT type is the frame DCT, the standard deviation is sought after the 8–8 frame blocks has been changed into the field block.

Therefore, the relations between the pixel values in the adjacent lines, characteristics of the block that will be compressed become precise, thereby increasing a compression ratio. In this case, the external memory 105 is designed to have the structure of field units all the time.

Figure 9:
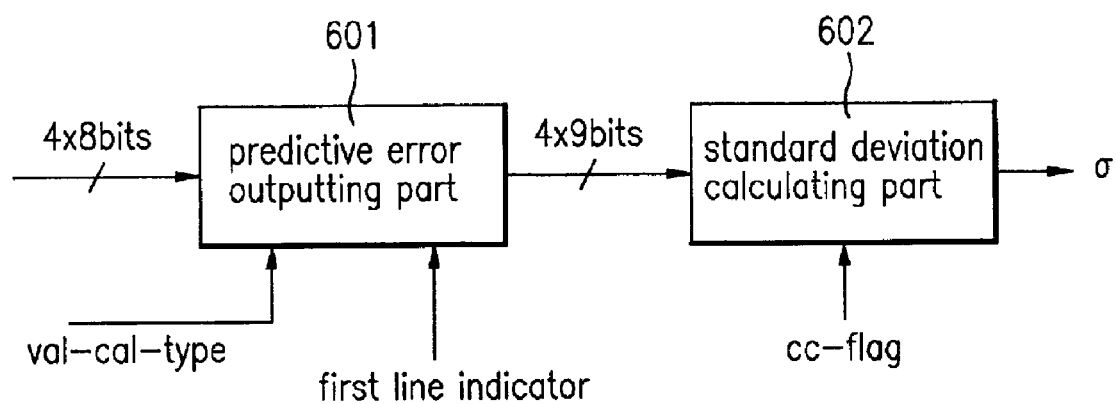
FIG. 9 shows a deviation estimating part in FIG. 3.

FIG. 9 shows in detail a deviation estimating part 202 in FIG. 3.

Referring to FIG. 9, the deviation estimating part 202 consists of a predictive error outputting part 601 reading the frame blocks by field block unit according to the var_cal_type and generating a predictive error of which redundancy is removed by using the relation between the current and previous pixels and a standard deviation calculating part 602 calculating a standard deviation by using the predictive errors outputted from the predictive error outputting part 601.

Figure 10:
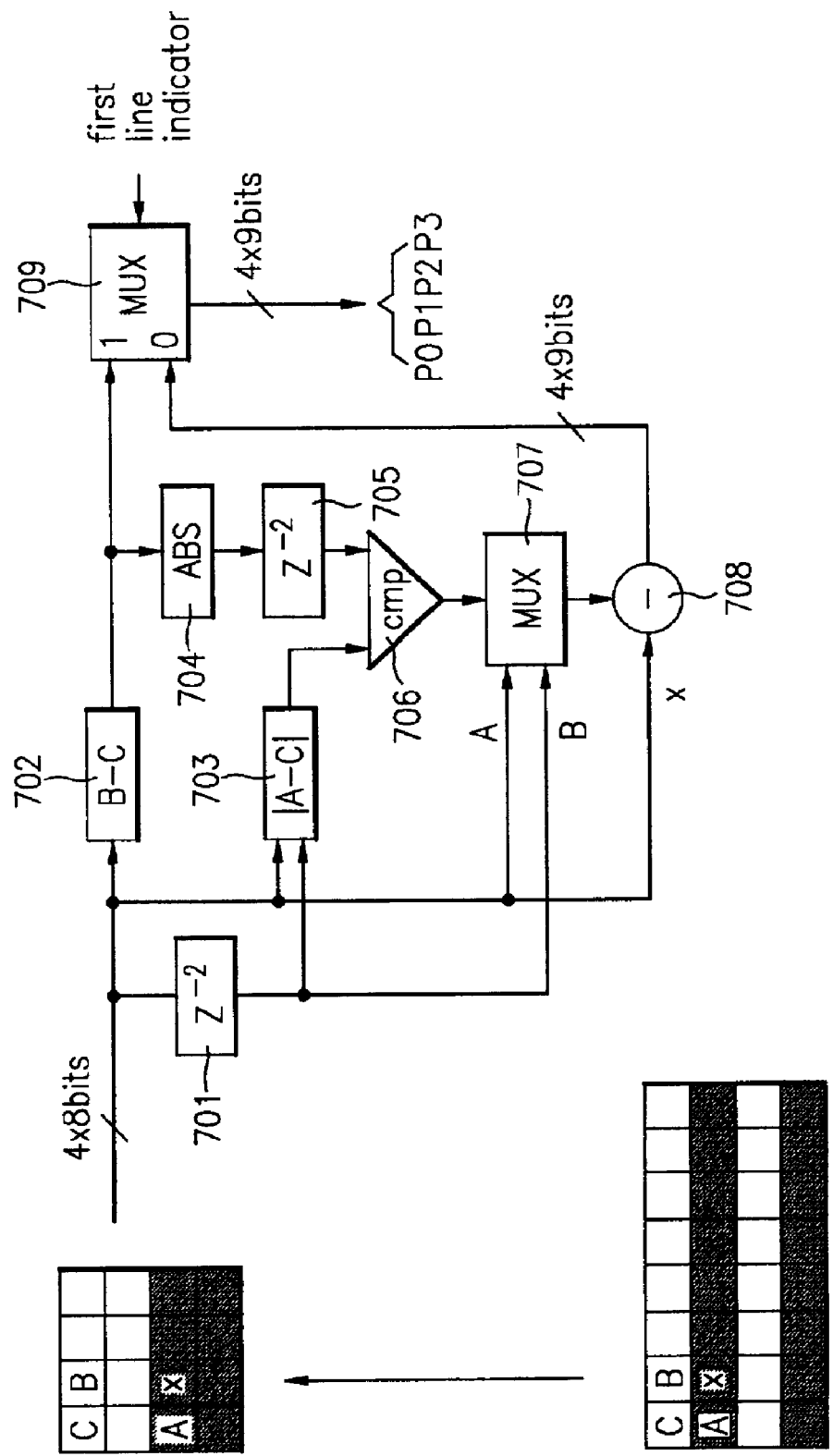
FIG. 10 shows a predictive deviation outputting part in FIG. 9 when val_cal_type is 0.
Figure 11:
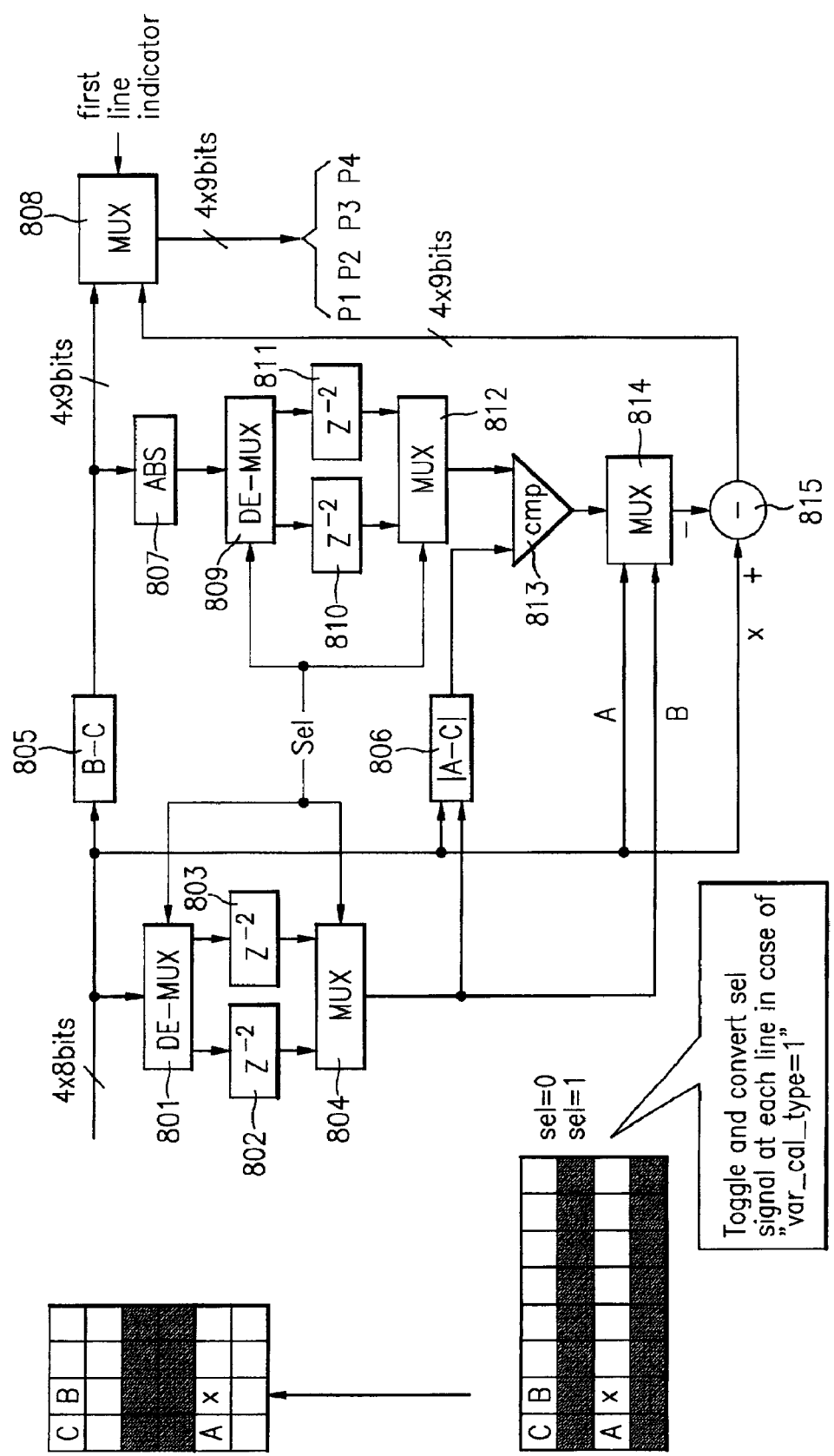
FIG. 11 shows a predictive deviation outputting part in FIG. 9 when val_cal_type is 1.
Figure 12:
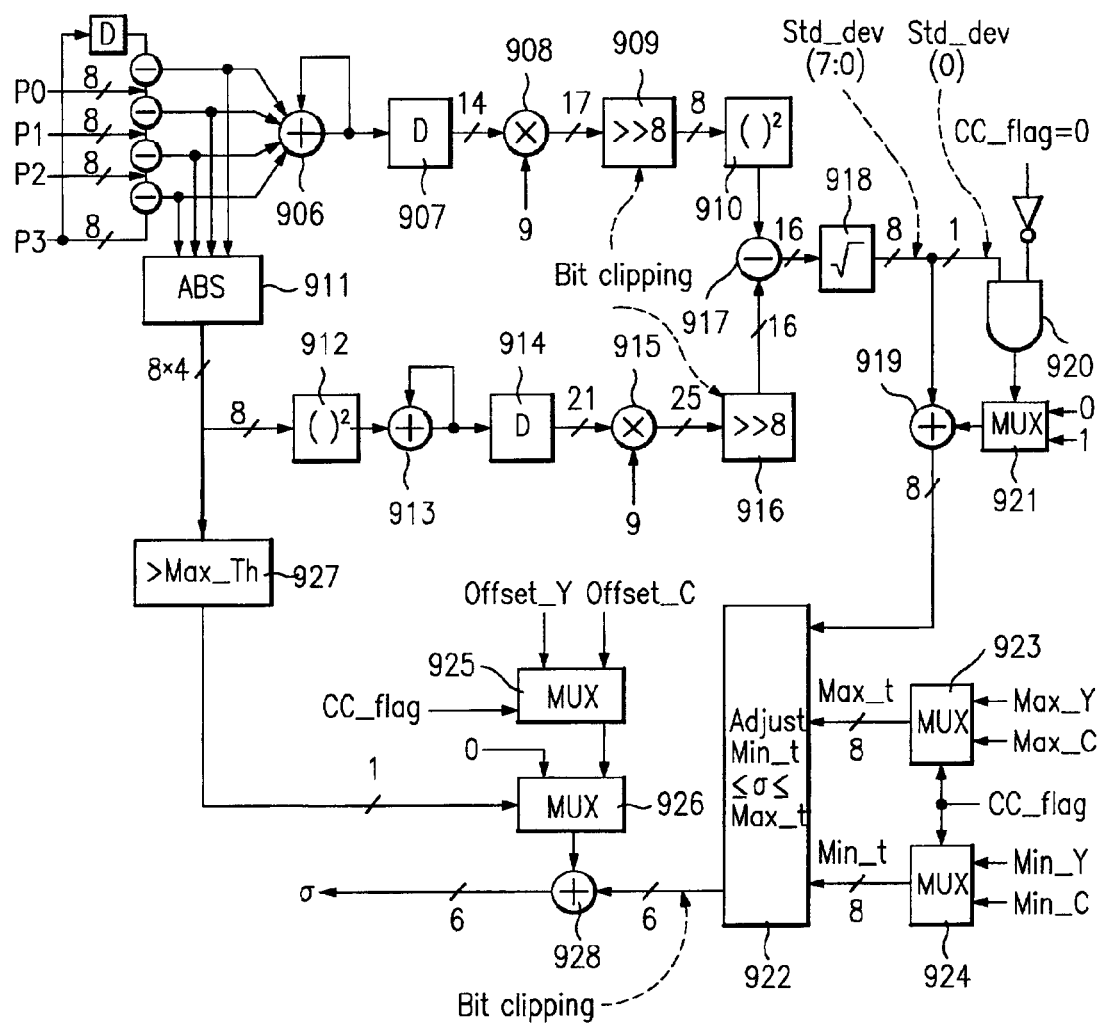
FIG. 12 shows a standard deviation calculating part in FIG. 9.

FIG. 10 shows a block diagram of a predictive deviation outputting part 601 when val_cal_type is '0', FIG. 11 shows a block diagram of a predictive deviation outputting part 601 when val_cal_type is '1', and FIG. 12 shows a diagram of a standard deviation calculating part 602 of the deviation estimating part 202.

The predictive error outputting part 601 includes the predictive error outputting parts in FIG. 10 and FIG. 11 respectively. If the predictive error outputting parts are regarded as a first predictive error outputting part and a second predictive error outputting part, respectively, a selection part should be established in front or rear of the first and second predictive error outputting parts.

For instance, if the selection part is established in front of the first and second predictive error outputting parts, the selection part outputs an output of the adder 201 to the first or second predictive error outputting part selectively according to the val_cal_type signal. Moreover, if the selection part is established in rear of the first and second predictive error outputting parts, the selection part outputs either an output of the first or second predictive error outputting part to the standard deviation calculating part 602 according to the val_cal_type signal.

In this case, the selection part may consist of a switching device, multiplexer or demultiplexer.

In this case, bits of the signal inputted to the predictive error outputting part 601 is 32 bits wherein four pixels are inputted into one clock. Namely, the predictive error outputting part 601 seeks predictive errors by 4 pixel units. For example, the predictive error outputting part 601 designed by the structures of FIG. 10 and FIG. 11 generates two-dimensionally predicted errors after two cycles.

Referring to the predictive error outputting part 601 in FIG. 10, the predictive error generating part 601 consists of a first delayer 701 delaying the four pixels inputted simultaneously for 1 clock as long as 2 clocks, a first subtracter 702 outputting a difference B–C between the one-line delayed pixel B and the one-line/one pixel delayed pixel by taking the currently-inputted pixel x as a reference, and a second subtracter 703 outputting an absolute value |A–C| of the difference A–C between the one-pixel delayed pixel A and the one-line/one-pixel delayed pixel C by taking the currently-inputted pixel x as a reference.

The predictive error outputting part 601 in FIG. 10 includes an absolute value operation part 704 taking an absolute value of an output of the first subtracter 702, a second delayer 705 delaying an output of the absolute value operation part 704 as long as two clocks to make the output of the absolute value operation part 704 delayed by one line and one pixel by taking the current pixel x as a reference, a comparator comparing the output sizes of the second subtracter 703 and the second delayer 705, and a first multiplexer 707 outputting a pixel A delayed by one pixel or another pixel B delayed by one line by taking an output of the comparator 706 as a selection signal and the current pixel as a reference.

The predictive error outputting part 601 consists of a third subtracter 708 outputting a difference between the current pixel x and the output of the first multiplexer 707, and a second multiplexer 709 outputting a final predictive error selected from one of the outputs of the firs subtracter 702 and third subtracter 708 by taking a value of the first line indicator as a selection signal.

If a data bus connected to the predictive error outputting part 601 has, for instance, 32 bits, four pixels are inputted into the first delayer 701 and first subtracter 702 of the predictive error outputting part 601 within a clock. Thus, the predictive error outputting part 601 generates a predictive error by four pixel unit.

In this case, if the pixel to be predicted is 'x', 'A' denotes a pixel, i.e. the previous pixel delayed by one pixel, to the left of the pixel to be predicted, 'B' is a pixel vertically-upper to the current pixel to be predicted, i.e., the one-line delayed previous pixel, and 'C' is a pixel located at a left-diagonal direction of the current pixel to be predicted, i.e. the One-pixel delayer previous pixel.

Thus, the predictive error outputting part 601 of the deviation estimating part 202 takes the pixel at the direction having less difference by measuring the difference between the horizontal and vertical directions of the previously-decoded pixels as a predictive value of the current pixel.

For the above-mentioned purpose, the first subtracter 702 outputs the difference between the currently-inputted pixel and the previous pixel to the second multiplexer 709 as soon as transfers to the absolute value operation part 704 to take an absolute value of the output. If the currently inputted pixel is 'B' and the previous pixel delayed by one pixel is 'C', the first subtracter 702 generates a value of (B–C).

An output of the absolute value operation part 704 is outputted to the comparator 706 after having been delayed by the second delayer 705 by two clocks.

And, the first delayer 701 delays the currently-inputted four pixels by two clocks and then outputs them to the second subtracter 703. If the currently-inputted pixel is 'A', the two-clock delayed pixel becomes 'C'. Thus, the second subtracter 703 takes an absolute value of the difference (A–C) between the currently-inputted and two-clock delayed pixels and outputs the absolute value to the comparator 706.

In this case, the reason why the values inputted to the first and second delayers 701 and 705 are delayed by two clocks is that the comparator 706 enables to compare |A–C| to |B–C| on account of the two-clock delay provided that the pixel to be currently predicted is 'x'.

The comparator 706 compares sizes of the outputs of the second subtracter 703 and the absolute value operation part 705 to generate a logic value, i.e. '0' or '1', thereby providing the first multiplexer 707 with the logic value as a selection signal.

In the embodiment of the present invention, if the output |A–C| of the second subtracter 703 is smaller than that |B–C| of the absolute value operation part 704, it is assumed that '1' is outputted as has less difference to the vertical direction. Otherwise, it is assumed that '0' is outputted as has less difference to the horizontal direction.

On the other hand, if the pixel to be currently predicted is 'x', the first multiplexer 707 is supplied with a previous pixel A by one pixel and an one-line delayed pixel B delayed by two-clock delay by the first delayer 701. In this case, the first multiplexer 707 selects 'B' if an output of the comparator 706 is '1' or 'A' if an output of the comparator 706 is '0', thereby outputting 'b' or 'A' to the third subtracter 708.

The third subtracter 708 outputs the difference x-A or x-B between the outputs of the pixel to be currently predicted and the first multiplexer 707 to the second multiplexer 709. In this case, a signal inputted to the second multiplexer 709 has 4×9 bits as the sign bit is attached during the subtraction of the first and third subtracters 702 and 708.

The second multiplexer 709 uses a value of the first line indicator as a selection signal, and it is assumed that '1' is outputted if the value of the first line indicator is at the first line of the current block.

Thus, the second multiplexer 709 decides either an output of the first subtracter 702 if it is the first line at present or an output of the third subtracter 708 if it is not the first line as a final predictive error, thereby outputting the value to the standard deviation calculating part 602.

Namely, the previous pixel value is outputted as a predictive error if it is the first line at the corresponding block. But, the difference between the current pixel and the pixel at the direction having less direction by measuring the vertical and horizontal difference between the previously-decoded pixels is outputted as the predictive error. In this case, as the first pixels of the respective columns are outputted originally without being compressed, it is not necessary to be considered at the hardware in FIG. 10.

In this case, the above-mentioned process is performed by four pixel unit, four pixels P0, P1, P2 and P3 are inputted to the standard deviation calculating part 602 within one clock.

FIG. 11 shows a block diagram of a predictive deviation outputting part in FIG. 9 when val_cal_type is 1. FIG. 11 differs from FIG. 10 in that a new sel signal, a first demultiplexer 801, a second demultiplexer 809, a fourth delayer 803, a fourth delayer 811, a third multiplexer 804, and a fourth multiplexer 812 are added and that the sel signal controls the first and second demultiplexers 801 and 809 and the third and fourth multiplexers 804 and 812.

The sel signal is toggled into '0' and '1' at each line. Namely, the case that the val_cal_type is '1' corresponds to that the DCT block of the macro blocks of the interlaced-scanned frame picture is the frame DCT coded block having odd and even lines and to the color signals in the field DCT coded block. In this case, the four of the 8×8 DCT transformed blocks in the macro block (i.e., 16×16) have the odd and even lines respectively.

Therefore, in order to read by field block unit the frame blocks where the even and odd lines cross each other by line unit in a block, the sel signals should be toggled each line.

In this case, the first demultiplexer 801 outputs the four pixel values inputted thereto by the sel signal to the first delayer 802 or third delayer 803. And, the third multiplexer 804 selects one of the outputs of the first and third delayers 802 and 803 by the sel signal, thereby outputting the output to the second subtracter 806 and the first multiplexer 814.

The second demultiplexer 809 and the fourth multiplexer 812 are controlled by the sel signal as well by the same method of the above-mentioned description. The rest of the operation is the same of FIG. 10, thereby skipping the detailed explanation.

Then, the predictive errors are calculated by processing the even and odd lines, respectively, as the predictive errors are obtained by four pixel unit. As a result, the frame block obtains the predictive error by field block unit.

In this case, the standard deviation obtained from the standard deviation calculating part 602 is outputted to the adaptive quantization part 302 of the ADPCM compressing part 204, the adaptive dequantization part 303 and the write FIFO 206.

The quantization code code(m,n) having gone through ADPCM in the ADPCM compressing part 204 is stored in the PCM buffer 205 as soon as is outputted to the write FIFO 206. As a result, the standard deviation and the quantization code are stored in the memory together, thereby enabling to be restored to the previous stage of ADPCM by the ADPCM decoder.

The PCM buffer 205, for example, has the size of 32×64 bits, which enables to store the information amounting to 11.5 macro blocks in the case of Y and the information amounting to 27 macro blocks in the case of C.

In this case, M 8 bits/pixel and M×(N–1) codes of ADPCM K bits show up in one sub block. Thus, the length of the code stored in the PCM buffer 205 is as follows.

$$\text{total bits/sub block} = M \times [8 + K \times (N-1)] \text{ bits}$$

In general, the coding process is achieved by using 16 quantization levels for a brightness signal and 8 quantization levels for a color signal. For the purpose of realizing an increased compression ratio, the quantization levels may be altered by the code_table_sel signal.

In this case, the ADPCM result of the respective blocks is expressed by the various bits according to the number of quantization levels. In order to store the ADPCM codes and standard deviations in the standard external memory having a constant data bus length, the output length of ADPCM should be fit for the data bus length. For this fitness, the write FIFO 206 is used.

Namely, the video decoder 102 communicates with data through the 32 bit data bus and the external memory 105 communicates with the 64 bit data bus, thereby adjusting a data rate through the write FIFO 206 by bit-alignment.

The write FIFO 206 performs the bit-alignment by using, for instance, a barrel shifter when the standard deviation and ADPCM quantization code code(m,n) are written/read to/from the external memory 105. The structure and specific description of the write FIFO 206 and the external memory 105, which are described in the previous specification, are skipped in the present description.

Besides, the bit streams stored in the external memory 105 by being compressed through the ADPCM compressing part 204 needs to be restored. For instance, the ADPCM stored bit streams are restored by being read from the external memory 105 to carry out motion compensation for the video decoder 105 and to display of the VDP 103.

For the above performance, the ADPCM enhancement part are installed in the memory reducing part 200. For example, the ADPCM enhancement part is drawn in FIG. 13, of which explanation (described in the previous specification) is skipped herein as well.

Figure 13:
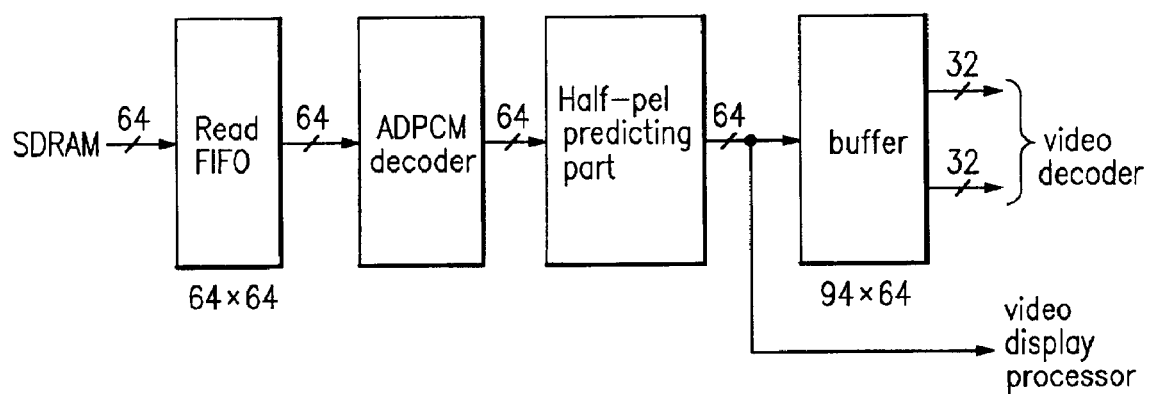
FIG. 13 shows an ADPCM enhancing part in FIG. 2.
Figure 14:
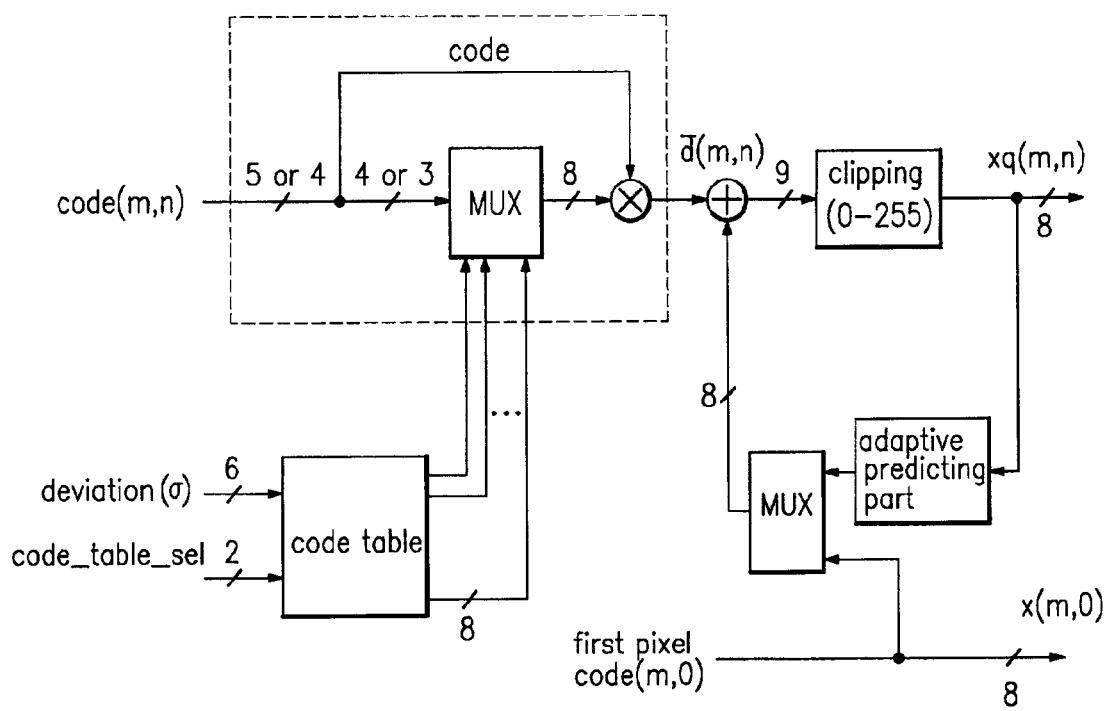
FIG. 14 shows an ADPCM decoder in FIG. 13.

FIG. 14 shows in detail an ADPCM decoder in FIG. 13.

Referring to FIG. 14, codes code(m,0) of the first pixels in the respective rows of the respective sub blocks have the original pixel values. Thus, the codes code(m,0) are decoded first and then restored by reading the pixel values from the code (m,n) in the memory and obtaining d(m,n).

In this case, the difference between the previous specification and FIG. 14 is that an adaptive prediction part is used for the ADPCM decoder of the present invention instead of a buffer because the predictive error is sought through the adaptive prediction part in the ADPCM compressing part 204.

Hence, compared to that of the ADPCM compressing part 204, the hardware structure of the ADPCM decoder is very simple.

When the process proposed by the present invention is applied to, a compression ratio of the external memory 105 is as follows.

M×N: block size of one macro block
n1: quantization bits for Y
n2: quantization bits for Cb and Cr
v1: standard deviation bits for Y
v2: standard deviation bits for Cb and Cr 1) The Case of Brightness total number of bits used for the compression of the corresponding macro block Y Bit_Y=(M×8+M×(N−1)×n1+v1)×256/(M×N), wherein M×8 is a pixel of first row, M×(N−1)×n1 is total quantization coefficient, and 256/(M×N) is the number of sub blocks in a macro block.

2) The Case of Color total number of bits used for the compression of the corresponding macro block (Cb,Cr)

Bit_C=(M×8+M×(N−1)×n2+v2)×128/(M×N), wherein M×8 is a pixel of first row, M×(N−1)×n2 is total quantization coefficient, and 128/(M×N) is the number of sub blocks in a macro block.

Moreover, when using two-dimensional ADPCM, the present invention enables to adjust a compression ratio by a code_table_sel signal after having stored the code tables of the wanted quantization levels in ROM as well as reduce the required memory size by storing standard codes of the respective quantization levels only.

Specially, the present invention enables to obtain standard deviations by predicting the current pixel using a pixel located at the highly-related direction which is determined by having the deviation estimating part measure the relation between the horizontal or vertical direction of the pixels adjacent there-between and to be currently encoded.

Further, the present invention enables to increase a compression ratio a swell as provide clear distinction of high definition by reducing the difference less than the bit precision of the current pixel by means of predicting the current pixel by selecting the pixel located at the highly-related direction with the above same method and performing quantization with the prediction.

An apparatus for receiving moving pictures for the reduction of an external memory of an MPEG-2 video decoding chip according to the present invention results in the following effects.

The present invention enables to increase visual effect of the restored image, improve peak-to-peak signal noise to ratio (PSNR), and simplify the hardware structure. Specifically, the present invention enables to greatly improve the horizontal edge distortion generated from 1-D ADPCM.

Moreover, the present invention enables to support various services such as OSD, multi-decoding and the like by maintaining clear distinction of high definition of MPEG-2 MP@HL by being applied to the application fields such as digital TV sets, video image conferences and the like, become very competitive in price by reducing the required width and capacity of memory, and enforce the technology competition with digital TV sets of other companies by improving the performance of the video decoding chip.

It will be apparent to those skilled in the art that various modifications and variations can be made in an apparatus for receiving moving pictures without departing from the spirit or scope of the inventions. Thus, it is intended that the present invention cover the modifications and variations of this invention provided they come within the scope of the appended claims and equivalents.

What is claimed is:

1. A memory reducing device of an apparatus for receiving moving pictures, comprising an adder adding IDCT data to motion-compensated data wherein the IDCT data is obtained by a video decoder;

a deviation estimate g part calculating a standard deviation from an output signal of the adder;

a storage buffer storing an output of the adder by macro block unit;

an ADPCM encoder performing ADPCM compression by applying the standard deviation to data of the macro block unit stored in the storage buffer;

a PCM buffer storage the ADPCM compressed data, quantization codes and the standard deviation; and a write memory reading the compressed data stored in the PCM buffer and storing the read data in an external memory, wherein the deviation estimating part comprises, a first predictive error outputting part selecting a pixel of video-decoded pixels prior to the current pixel, wherein the selected pixel has a least difference from the current pixel horizontally and vertically, an generating a difference between the selected pixel and the current pixel as a predictive error, and a second predictive error outputting part selecting a pixel of video-decoded pixels prior to the current pixel, wherein the selected pixel has a least difference from the current pixel horizontally and vertically, generating a difference between the selected pixel and the current pixel as a predictive error, and obtaining the predictive error by transforming a frame block into a field block if an image signal inputted thereto is an interlaced scanning sequence as well as a picture of the frame block.

2. The device of claim 1, wherein the write memory is a FIFO(first in first out) memory.

3. The device of claim 1, wherein the deviation estimating part comprises:
a selection part selecting one of outputs from the first and second predictive error outputting parts as a final prediction error by using a signal indicating whether the inputted image signal is the interlaced scanning sequence as well as the picture of the frame block as a selection signal, and
a standard deviation calculating part obtaining a standard deviation of the final predictive error outputted through the selection part by the sub block unit.

4. A memory reducing device of an apparatus for receiving moving pictures, comprising:
an deviation estimating part calculating a standard deviation by using a difference relation between a current pixel an a high correlated pixel of video-decoded pixels prior to the current pixel;
a buffer storing values of the video decoded pixel by a macro block unit and outputting the values by a sub block unit smaller than the macro block unit; and
an ADPCM compressing part outputting original pixel values of rows of respective sub blocks outputted from the buffer, coding a difference between the high correlated pixel and the current pixel of remaining portions of the rows, and adjusting quantization intervals by applying the standard deviation when coding, wherein the high correlated pixel has a least difference from the current pixel in a vertical relation and a horizontal relation.

5. The device of claim 4, wherein the macro block unit is divided into sub block units of 4 pixels×8 bits and the standard deviation is obtained by each sub block unit.

6. The device of claim 4, the deviation estimating part further comprising.
a first predictive error outputting part selecting a pixel of video-decoded pixels prior to the current pixel, where the selected pixel has the least difference from the current pixel horizontally and vertically, and generating a difference between the selected pixel and the current pixel as a predictive error;
a second predictive error outputting part selecting a pixel of video-decoded pixels prior to the current pixel, where the selected pixel has the least difference from the current pixel horizontally and vertically, generating a difference between the selected pixel and the current pixel as a predictive error, and obtaining the predictive error by transforming a frame block into a field block if an image signal inputted thereto is an interlaced scanning sequence as well as a picture of the frame block;
a selection part selecting one of outputs from the first and second predictive error outputting parts as a final predictive error by using a signal indicating whether the inputted image signal is the interlaced scanning sequence as well as the picture of the frame block as a selection signal; and
a standard deviation calculating part obtaining a standard deviation of the final predictive error outputted through the selection part by the sub block unit.

7. The device of claim 6, wherein the first and second predictive error outputting parts obtain the predictive errors by four pixel unit.

8. The device of claim 6, wherein the selection part consists of one of a switching device, a multiplexer an a demultiplexer.

9. The device of claim 6, wherein the first predictive error outputting part and the selection part further comprising:
a first delayer delaying a plurality of pixels for two clocks wherein the pixels are inputted simultaneously within on clock;
a first subtracter obtaining a difference between a currently-inputted pixel and a previous pixel delayed by one pixel;
a first operation part taking an absolute value of an output of the first subtracter and delaying the absolute value for two clocks;
a second operation part taking an absolute value of a difference between a pixel delayed for one clock by taking current pixel to be predicted as a reference and the pixel delayed by the first delayer;
a comparator comparing output sizes of the second and first operation parts;
a first multiplexer outputting selectively either the one-pixel delayed pixel or the two pixel-delayed pixel by taking current pixel to be predicted as a reference according to an output of the comparator;
a third subtracter outputting a difference between a current pixel to be predicted and an output pixel of the first multiplexer; and
a second multiplexer outputting an output of the first or third subtracter as a final predictive error to the standard deviation calculating part by taking a value of a first pixel indicator as a selection signal, and
wherein the respective elements are operated by a unit of a plurality of pixels inputted simultaneously within one clock.

10. The device of claim 6, wherein the second predictive error outputting part and the selection part further comprising:
a first delaying part consisting of a first and a second delayer delaying a plurality of pixels inputted simultaneously within one clock for two clocks respectively;
a first subtracter obtaining a difference between a currently-inputted pixel and an one-pixel delayed pixel;
a first absolute value operation part taking an absolute value of an output of the first subtracter;
a second delaying part consisting of a third and fourth delayer delaying the absolute value of the first absolute value operation part for two clocks respectively;
a selection part controlling an input/output of the first or second delayer by a selection signal toggled by each line and simultaneously controlling an input/output of the third and fourth delayers;
a second subtract obtaining a difference between an one-pixel delayed pixel by taking the pixel to be predicted a reference and a pixel delayed by the first delaying part wherein the one-pixel delayed pixel and the pixel delayed by the first delaying part are inputted through the selection part;

a second absolute value operation part taking an absolute value of the difference outputted from the second subtracter;

a comparator receiving outputs of the second absolute value operation part and the second delaying part and comparing sizes of the received outputs;

a first multiplexer outputting an one-pixel delayed pixel or a two-pixel delayed pixel by taking a current pixel to be predicted as a reference and taking an output of the comparator as a selection signal;

a third subtracter outputting a difference between a current pixel to be predicted and a pixel outputted from the first multiplexer; and a second multiplexer outputting an output of the first or third subtracter as a final predictive error to the standard deviation calculating part by taking a value of a first pixel indicator as a selection signal, and wherein the respective elements are operated by a unit of a plurality of pixels inputted simultaneously within on clock.

11. The device of claim 4, the ADPCM compressing part further comprising:

a subtracter outputting a difference between an output data of the buffer and an adaptively-predicted data;

an adaptive quantization part performing quantization adaptively using the output data of the subtracter and the standard deviation;

an adaptive dequantization part inversely-quantizing the quantized data;

an adder adding output data of the adaptive dequantization part to the adaptively-predicted data; and an adaptive predicting part performing adaptive prediction from an output data of the adder and outputting the performed resultant which is the adaptive prediction data to the subtracter and the adder.

12. The device of claim 11, the adaptive prediction part further comprising:

a first delayer delaying an output of the adder by 1 clock;

a second delayer delaying an output of the first delayer by 7 clocks;

a third delayer delaying an output of the second delayer by 1 clock;

a first multiplexer outputting selectively one of outputs of the first and second delayers;

a first subtracter outputting a difference between the outputs of the first delayer and the third delayer;

a first absolute value operation part taking an absolute value of an output of the first subtracter;

a second subtracter outputting a difference between the outputs of the second delayer and third delayer;

a second absolute value operation part taking an absolute value of an output of the second subtracter;

a comparator comparing outputs of the first and second absolute value operation parts;

a logic gate outputting a logic combination value as a selection signal to the first multiplexer by combining logically an output of the comparator with an output of an inverter which is attained by inverting a value of a first line indicator; and a second multiplex selecting as a final output either an output of the first multiplexer of an original pixel value which is not compressed using a first column pixel value as a selection signal.

13. The device of claim 4, wherein the deviation estimating part further comprises:

a first delayer delaying a plurality of pixels for two clocks wherein the pixels are inputted simultaneously within one clock;

a first subtracter obtaining a difference between a currently-inputted pixel and a previous pixel delayed by one pixel;

a first operation part taking an absolute value of an output of the first subtracter and delaying the absolute value for two clocks;

a second operation part taking an absolute value of a difference between a pixel delayed for one clock by taking a current pixel to be predicted as a reference and the pixel delayed by the first delayer;

a comparator comparing output sizes of the second and first operation parts;

a first multiplex outputting selectively either the one-pixel delayed pixel or the two pixel-delayed pixel by taking a current pixel to be predicted as a reference according to an output of the comparator;

a third subtracter outputting a difference between a current pixel to be predicted and an output pixel of the first multiplexer; and a second multiplexer outputting an output of the first or third subtracter as a final predictive error to the standard deviation calculating part by taking a value of a first pixel indicator as a selection signal, and wherein the respective elements are operated by a unit of a plurality of pixels inputted simultaneously within on clock.

14. A memory reducing device of an apparatus for receiving moving pictures, comprising:

an deviation estimating part configured to calculate a standard deviation by using a difference relation between a current pixel and a high correlated pixel of video-decoded pixels prior to the current pixel;

a buffer configured to store values of the video decoded pixel by a macro block unit and outputting the values by sub block unit smaller than the macro block unit;

an ADPCM compressing part configured to output original pixel values of first rows of respective sub blocks outputted from the buffer, coding a difference between the high correlated pixel and the current pixel of remaining portions of the rows, and adjusting quantization intervals by applying the standard deviation when coding, further comprising, a first delayer configured to delay a plurality of inputted pixels for a first prescribed delay;

a second delayer configured to delay the plurality of inputted pixels for a second prescribed delay;

a third delayer configured to delay the plurality of inputted pixels for a third prescribed delay;

a first multiplexer configured to output selectively one of outputs of the first and second delayers;

a first operator configured to output an arithmetic comparison between the outputs of the first delayer and the third delayer;

a second operator configured to output an arithmetic comparison between the outputs of the second delayer and third delayer;

a comparator configured to compare outputs of the first and second operators;

a logic gate configured to output a logic combination value as a selection signal to the first multiplexer by combining logically an output of the comparator with a first line indicator; and a second multiplexer configured to select as a final output either an output of the first multiplexer or an original pixel value which is not compressed using a first column pixel value as a selection signal.

* * * * *